United States Patent
Feng

(10) Patent No.: US 10,246,347 B2
(45) Date of Patent: Apr. 2, 2019

(54) BIOCHAR TREATMENT OF CONTAMINATED WATER

(71) Applicant: Southwest Research Institute, San Antonio, TX (US)

(72) Inventor: Maoqi Feng, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 313 days.

(21) Appl. No.: 14/861,781

(22) Filed: Sep. 22, 2015

(65) Prior Publication Data

US 2016/0096746 A1 Apr. 7, 2016

Related U.S. Application Data

(60) Provisional application No. 62/054,316, filed on Sep. 23, 2014.

(51) Int. Cl.
*C02F 1/00* (2006.01)
*C02F 1/28* (2006.01)
(Continued)

(52) U.S. Cl.
CPC .............. *C02F 1/283* (2013.01); *C02F 1/004* (2013.01); *C02F 2101/10* (2013.01); *C02F 2101/30* (2013.01); *C02F 2103/10* (2013.01); *C02F 2303/16* (2013.01); *Y02A 20/156* (2018.01); *Y02W 10/37* (2015.05)

(58) Field of Classification Search
CPC .. C02F 1/283; C02F 2103/10; C02F 2303/16; C02F 1/004; C02F 2101/10; C02F 2101/30; C01B 32/36; B01J 20/3416; Y02A 20/156; Y02W 10/37

See application file for complete search history.

(56) References Cited

U.S. PATENT DOCUMENTS

| | | | | |
|---|---|---|---|---|
| 3,568,405 A | * | 3/1971 | Perry | B01D 15/00 |
| | | | | 210/675 |
| 3,625,886 A | * | 12/1971 | Mattia | C02F 1/281 |
| | | | | 203/92 |

(Continued)

FOREIGN PATENT DOCUMENTS

| CN | 103224262 A | * | 7/2013 |
|---|---|---|---|
| KR | 101190282 B1 | * | 10/2012 |
| WO | 2009016381 A2 | | 2/2009 |

OTHER PUBLICATIONS

FB Industries, Industry News, Researchers developing new low-cost fracking water treatment, Aug. 2013 [Retrieved on Jan. 4, 2018]. [Retrieved from the internet: <URL:https://www.fbindustriesinc.com/news/2013/08/researchers-developing-new-low-cost-fracking-water-treatment/>, 2 pages.*

(Continued)

*Primary Examiner* — Matthew O Savage
(74) *Attorney, Agent, or Firm* — Grossman, Tucker et al.

(57) ABSTRACT

The present disclosure relates generally to the treatment of water using biochar. More specifically, the treatment of flowback water from drilling operations such as hydraulic fracturing or the treatment of tailing water from tar sands production. Such treatment results in the reduction of various constituents such as metal ions, organic compounds and various metals to provide recycled water suitable for reuse or discharge.

16 Claims, 4 Drawing Sheets

(51) Int. Cl.
  *C02F 103/10* (2006.01)
  *C02F 101/10* (2006.01)
  *C02F 101/30* (2006.01)

(56) References Cited

U.S. PATENT DOCUMENTS

2009/0050572 A1* 2/2009 McGuire ............... C02F 1/004
  210/638
2014/0151296 A1* 6/2014 Moore ................... C02F 1/283
  210/616
2014/0352378 A1 12/2014 Shearer et al.

OTHER PUBLICATIONS

Ahmadun, F-R., et al; "Review of Technologies for Oil and Gas Produced Water Treatment"; Journal of Hazardous Materials vol. 170, (2009), pp. 530-551.

Anderson, J., et al; "Producing Natural Gas From Coal", Oilfield Review vol. 15, Issue 3, (Autumn 2003), pp. 8-31.

Biochar Info Website. "Biochar Overview." CarbonZero Project, Switzerland. <<https://biochar.info/biochar.biochar-overview.cfml>>; (accessed Apr. 20, 2017).

Brown, G.N., et al; "Comparison of Organic and Inorganic Ion Exchangers for Removal of Cesium and Strontium from Simulated and Actual Hanford 241-AW-101 DSSF Tank Waste"; prepared for the USDOE under Contract; Pacific Northwest National Laboratory, Richland, Washington: (1996) 98 pgs.

Cooks, S.; "Adsorption of Inorganics Compounds Found in Hydraulic Fracking Produced Water Utilizing Cost-effective Biochar Treatment"; MSc. Thesis, UTSA, (Apr. 2014) 103 pgs.

Gerlach, I., et al "Preparation of Nanosized Metal (oxides) by Gas Phase Hydrolysis Using Mesoporous Materials as Nanoreactors." Journal of Nanoparticle Research, Nov. 2009, vol. 11, Issue 8, pp. 2049-2059 Abstract Only <<https://link.springer.com/article/10.1007/s11051-008-9570-1>> accessed Sep. 21, 2017.

Hiller, J. "UTSA, SwRI Study Oil-field Wastewater" Express-news.net (Sep. 14, 2014).

2017 International Biochar Initiative Website. <<http://www.biochar-international.org/>> (accessed Apr. 20, 2017).

Marinin, D.V., et al; "Studies of Sorbent/Ion-Exchange Materials for the Removal of Radioactive Strontium from Liquid Radioactive Waste and High Hardness Groundwaters"; Waste Management, vol. 20. pp. 545-553 (2000).

Mohan, D., et al; "Sorption of Arsenic, Cadmium, and Lead by Chars Produced From Fast Pyrolysis of Wood and Bark During Bio-Oil Production"; Journal of Colloid and Interface Science 310, Abstract Only pp. 57-73 (2007) <<http://www.sciencedirect.com/science/article/pii/S0021979707000409>> accessed apr. 20, 2017.

NPC (National Petroleum Council) "Unconventional Gas." Topic Paper #29 (prepared by the Unconventional Gas Subgroup of the Technology Task Group of the NPC Committee on Global Oil and Gas). 52 pp. (2007).

Ravilious, K.. "Biochar Boosts Crop Yield Most for Weathered Soils." Environmental Research Web (Dec. 20, 2013), <<http://environmentalresearchweb.org/cws/article/news/55733>> (accessed Apr. 20, 2017).

Shukman,D.; "What is fracking and why is it controversial?" BBC News Website (Dec. 16, 2015), http://www.bbc.com/news/uk-14432401.

University of California Biochar Database, <<http://biochar.ucdavis.edu/>> (accessed Apr. 20, 2017).

Yang, H., et al; "Characterization of Biochar Properties Affected by Different Pyrolysis Temperatures Using Visible-Near-Infrared Spectroscopy"; International Scholarly Research Network, ISRN Spectroscopy; vol. 2012, Article ID 712837, 7 pps.

\* cited by examiner

US 10,246,347 B2

BIOCHAR TREATMENT OF CONTAMINATED WATER

CROSS REFERENCE TO RELATED APPLICATIONS

This application claims the benefit of U.S. Provisional Application Ser. No. 62/054,316 filed Sep. 23, 2014.

FIELD

The present disclosure relates generally to the treatment of water using biochar. More specifically, the treatment of flowback water from drilling operations such as hydraulic fracturing or the treatment of tailing water from tar sands production. Such treatment results in the reduction of various constituents such as metal ions, organic compounds and various metals to provide recycled water suitable for reuse or discharge.

BACKGROUND

Unconventional resources such as shale gas currently account for 30% of U.S. gas production, and the unconventional gas production is expected to increase in the next 25 years. Production of unconventional oil and gas needs relatively large volumes of water and generates waste stream. Handling of these large volumes of produced water and the associated costs have limited the development of both conventional and unconventional reservoirs. Development of oil and gas resources is becoming increasingly constrained due to environmental concerns and regulations, new methods are needed for the efficient handling of produced water using environmentally acceptable and economically viable technology.

Development of new technology for managing waters generated in association with oil and gas production is expected to reduce the cost and increase the efficiency of producing these resources while minimizing environmental impact. This is a critical issue for the sustainability of oil and gas drilling and for expansion in emerging areas.

Flowback water from drilling operations such as hydraulic fracturing typically contains inorganic metal salts, organics, and biocides. Such components are among the more difficult to treat and tend to limit the utility of the water for reuse or other purposes. Mercury, arsenic, and selenium present a difficult challenge for many types of current treatment options, and concentrations of these constituents in some produced waters can be relatively high.

Current technologies for flowback water treatment, such as reverse osmosis (RO) and electrodialysis, for treating oil and gas produced waters, has been limited by the presence of relatively large amounts of dissolved solids and organics in such waters which can cause rapid and severe deterioration of filtration membranes.

Most current technologies for treating produced waters are relatively costly, especially considering the large volumes of water produced and energy requirements, and are often unable to achieve the new, rigorous water-quality standards. New, low cost, and readily implemented approaches are needed for management of water associated with development of conventional and unconventional oil and gas reserves.

SUMMARY

The present disclosure relates to treatment of water using biochar. More specifically, the present disclosure stands directed at the treatment of flowback water drilling operations or tailing water from tar sand production using a biochar sorbent. The biochar serves to remove various components of the water thereby producing recycled water that may be employed, e.g., in further drilling operations, such as hydraulic fracturing. The recycled water may also be employed for certain farming and agricultural applications.

Accordingly, in method form, the present disclosure relates to a method for treatment of water to produce recycled water comprising supplying a biochar sorbent bed and supplying water containing organic and inorganic contaminants to the biochar sorbent bed wherein the biochar removes all or a portion of the contaminants and recovering recycled water wherein the levels of contaminants are reduced or removed.

In related embodiment, the present disclosure relates to a method for treatment of contaminated water comprising supplying contaminated water containing dissolved solids to be removed and treating the contaminated water with biochar, wherein the biochar is present at a level of 0.5% by weight to 30% by weight of the contaminated water. The biochar therefore serves to remove 40% by weight to 90% by weight of the dissolved solids in the contaminated water.

In still further related embodiment, the present disclosure relates to a method for treatment of flowback water from drilling operations comprising supplying flowback water containing dissolved solids to be removed and treating the flowback water with biochar, wherein the biochar is present at a level of 10.0% by weight to 30% by weight of the flowback water. The biochar then serves to remove 40% by weight to 90% by weight of the dissolved solids in the flowback water.

BRIEF DESCRIPTION OF THE DRAWINGS

The detailed description below may be better understood with reference to the accompanying figures which are provided for illustrative purposes only and are not to be considered as limiting any aspect of this disclosure.

DETAILED DESCRIPTION

Figure 1:
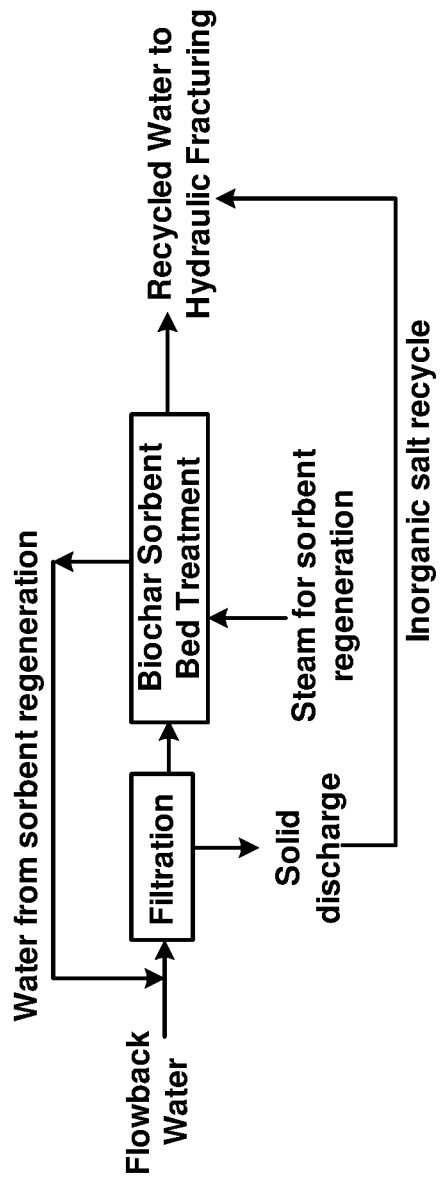
FIG. 1 illustrates a process flow diagram for flowback water treatment employing biochar.

The present invention relates to a relatively low-cost process of treating water with biochar. This may include treatment of flowback water from drilling operations such hydraulic fracturing. Flowback water therefore amounts to a water based solution that typically flows back to the surface during and after the completion of hydraulic fracturing and can contain various clays, chemical additives, and variety of total dissolved solids (TDS). It can also include treatment of tailing water from tar sands production (i.e. the mining of clay, sand, water and bitumen). This process is able to effectively and efficiently reduce the concentrations of multiple constituents, including inorganic metal ions, organics, and biocides, in contaminated water to levels that allow reuse or discharge.

More specifically, the present disclosure relates to the use of biochar for treatment of water from various drilling operations. Biochar is understood herein as a charcoal that is created by pyrolysis of biomass. The biomass used for formation of pyrolysis products can be obtained from a variety of sources. The biomass can be any material containing organic carbon. For example, the biomass can be plant material, cellulosic materials, lignin containing material, animal by-products, organic wastes, landfill matter, marine waste, agricultural waste, animal or human waste, other naturally derived sources of carbon, or any combination thereof.

The pyrolysis occurs by heating the biomass in a low or no molecular oxygen ($O_2$) gas type environment. Preferably, the pyrolysis takes place in a complete or pure inert gas environment, such as in the presence of only nitrogen and/or argon. The oxygen naturally present in the biomass is understood to allow for effective pyrolysis, which can fall in the range of 10% by weight to 60% by weight. The time period for pyrolysis may fall in the range of 1.0-3.0 hours, more preferably 1.5 to 2.0 hours, at temperatures of 300° C. to 600° C. in an inert-gas atmosphere, such as nitrogen. These conditions serve to prevent combustion.

Preferably, the biochar herein is produced by pyrolysis of wood chips such as oak-wood chips, dewaxed pine wood chips, cellulose, plant hulls and/or lignin substrates and the surface area of the biochar produced may fall in the range of 200 $m^2$-500 $m^2$.

An important feature of the biochar employed herein is its ability to remove various components of contaminated water such as flowback water or tailing water such that the water can be recycled. The components include various organic and inorganic components. These may therefore include oil, suspended solids, ammonia, nitrogen, iron, manganese, heavy metals (metals or metalloids of environmental concern) and hydrogen sulfide. Preferably, the biochar produced from wood pyrolysis is contemplated as an adsorbent for the removal of the metals ($As^{3+}$, $Cd^{2+}$, $Pb^{2+}$). Biochar adsorbents are also capable of removing iron, manganese, total organic carbon (carbon bound in organic compounds), and BTEX compounds (benzene, toluene, ethylbenzene and xylenes). For a given sample of contaminated water, such as flowback water, the biochar is preferably present at a level of 0.5% wt. to 30.0% wt. of the flowback water to be treated. More preferably, the biochar is present at level of 10.0% wt. to 30.0% wt., and in a most preferred embodiment, the biochar is present at a level of 15.0% wt. to 25.0% wt. in the flowback water for which removal of dissolved solids is desired. A process flow diagram is presented in FIG. 1 in the representative context of treatment of flowback water. Flowback water may be understood as a water based solution that flows back to the surface during and after the completion of hydraulic fracturing. The process of FIG. 1 would therefore be applicable to other situations where a contaminated water supply is contemplated for treatment. As illustrated, the flowback water is preferably first filtered to remove solid particulate (60 mesh or larger). Such filtered water is then introduced to the biochar sorbent bed for treatment, which as noted, will serve to remove or reduce organic and inorganic compounds, including biocides and metal ions. Following treatment recycled water is produced that is suitable for use in further hydraulic fracturing. However, as contemplated herein, the water may also be recycled for other applications, such as in the agricultural industry.

In addition, as illustrated in FIG. 1, the biochar may be conveniently exposed to steam regeneration, which is reference to the feature that the biochar may be treated with steam such that the biochar bed is regenerated so that it may be used as a sorbent for further treatment of flowback water. As shown the water from the steam regeneration may be conveniently directed back to the front-end of the system and combined with the flowback water for ensuing filtration and exposure to the biochar sorbent bed. Stated another way, whenever the biochar sorbent bed reaches breakthrough, the sorbent bed herein may be conveniently regenerated by steam injection. The resulting liquid waste is then, as illustrated, conveniently combined with untreated flowback water for treatment until condensate blowdown is required. That is, for continuous operation one can occasionally remove a bed from service and replace the biochar or one can include a blowdown (purge) of the condensate system when the contaminants reach a relatively high level. In addition, it is contemplated herein that the biochar may also be regenerated by $CO_2$ injection at temperatures of 200° C. and above. It should be also noted at this point that the biochar sorption bed may be washed with a dilute solution of sodium carbonate to precipitate and remove metal ions.

Some of the advantages of this approach include, but are not limited to relatively low operating costs, no chemicals are required, relatively high efficiency of filtration and removal of contaminants, relatively low maintenance, and excellent safety operation (no moving parts). The flow rates through the biochar sorbent beds may be configured on the order of 5.0 liters/minute to 50.0 liters/minute. The system also provides relatively complete mobility for the biochar sorbent bed and durability in application. Furthermore, the use of biochar and its ability to be tuned to a particular sorbent absorption requirement provides for a water treatment system that can target relatively wide ranges and levels of organic and inorganic contaminants.

Figure 2:
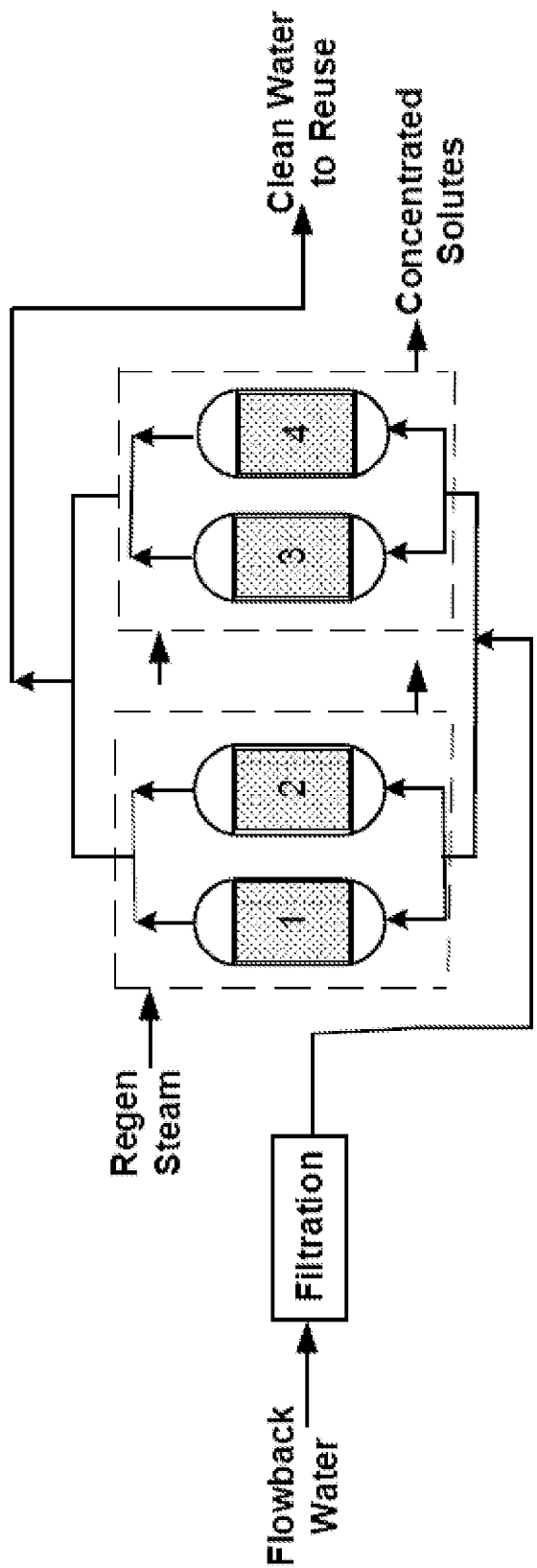
FIG. 2 illustrates a flow diagram for flowback water treatment employing swing-bed type operation.

In addition, it should be noted that the biochar sorbent bed may be one that is of a swing-bed type design, as shown in FIG. 2. That is, the flowback water after filtration can be introduced to one or more biochar sorbent beds while other sorbent beds (positioned in parallel) can be exposed to steam regeneration. Accordingly, the system here can be made continuous such that the flowback water of a given drilling operation is continuously filtered and exposed to biochar sorbent treatment.

Figure 3:
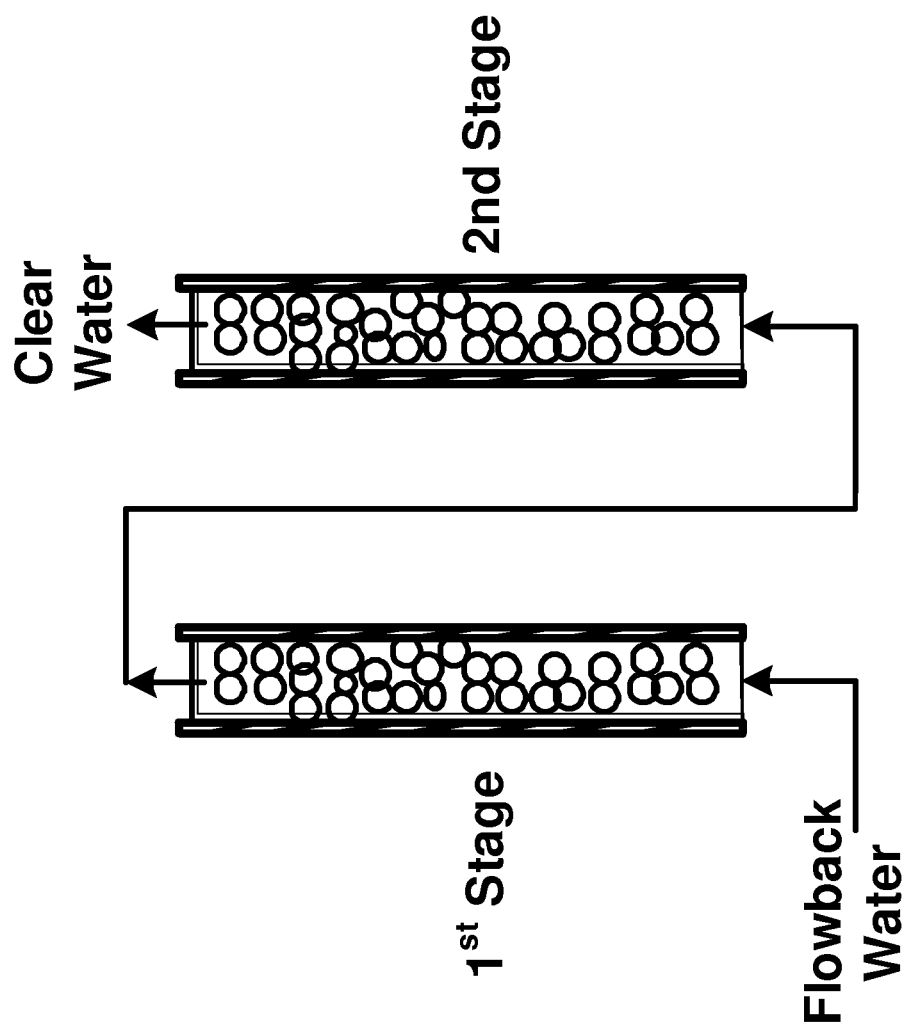
FIG. 3 illustrates a two-stage biochar sorbent bed for flowback water treatment.

Furthermore, one may also employ a biochar treatment system that relies upon a two-stage type treatment operation as illustrated in FIG. 3. In such a system, the $1^{st}$ stage may be configured such that it selectively absorbs relatively high levels of organics in the flowback water. Accordingly the $2^{nd}$ stage may be used as a finishing step to provide a flowback water (clear water as indicated) that has a particular targeted contaminant level. The present disclosure therefore contemplates the use of sequential filtration employing biochar as the sorbent media, where the biochar is preferably positioned at the $2^{nd}$ stage, as shown in FIG. 3.

Figure 4:
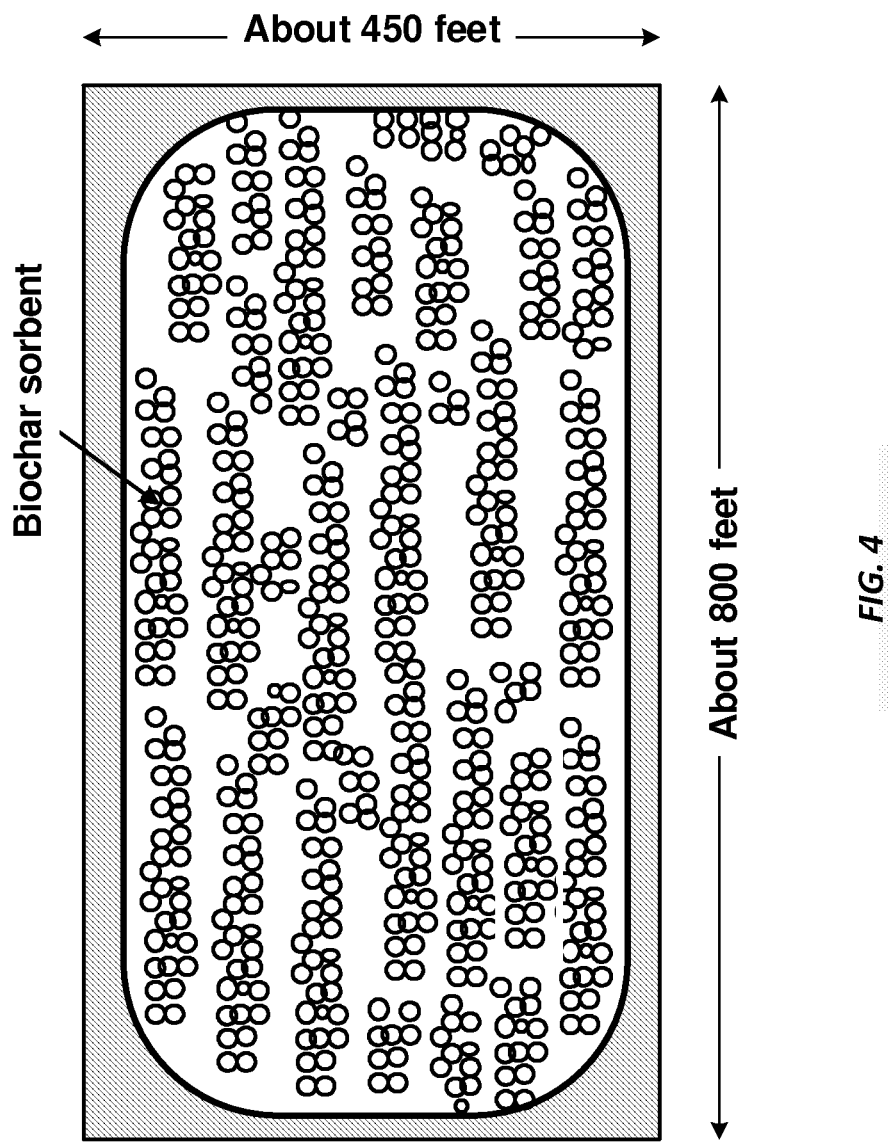
FIG. 4 illustrates a pond with biochar sorbent for flowback water treatment.

It is also contemplated herein that the biochar sorbent system may be used in what may be described as an open-pond system. More specifically, an open pond area may be filled with a layer of biochar, preferably on top of a layer of sand, for water treatment purposes. See FIG. 4. While the pond may assume a relatively large area (length of about 800 feet and width of about 450 feet) the use of the biochar in such a manner still serves to provide a relatively low-cost method for treatment of flowback water. In addition, it is contemplated that the biochar may be treated with $TiO_2$ so that the biochar may then be regenerated by solar energy. The biochar may, e.g., be treated with a $TiO_2$ precursor such as $Ti(OCH_3)_4$ which is first adsorbed on the biochar. The biochar may then be hydrolyzed by exposing the adsorbed precursor to water vapor and the resulting adsorbent is activated by heating to 500° C. for about 3.0 hours.

By way of one representative working example, wastewater samples were taken from fracking at the Eagle Ford Shale, which is a sedimentary rock formation underlying South Texas. A sample of such wastewater was taken and weighed. In order to find the ratio between water and residue in the wastewater, the sample was placed on a hot plate and heated at 100° C. to evaporate the water. The sample was then weighed again and the equation Residue %=100×Leftover Residue Weight/Initial Wastewater Weight was used to determine the percent of residue as the control.

Then, 10 ml of wastewater was mixed with an adsorbent being either different types of activated carbon (charcoal) or biochar. The biochar was produced from pyrolysis of pine wood chips at 450° C. The surface area of the biochar was 200 m$^2$/g to 300 m$^2$/g. For comparison, Gill Charcoal is reference to commercially available charcoal sold under the trademark BACKYARD GRILL™ charcoal briquetes. Activated carbon (from coconut shells) was purchased from Norit, Atlanta Ga. Activated carbon (regular) was purchased from Fisher Scientific.

The samples were left for 24 hours for adsorption, and then the remaining liquid was removed with a pipette and placed in a vial on the hot plate at 100° C. Using the same equation as noted above, the percent of residue was found and compared with the control to determine if the adsorbents had any effect on the ratio of water and residue in the wastewater. The data is presented below:

| Trial-1: Total Dissolved Solids Removal Data | | | |
|---|---|---|---|
| Sample | Eagle Ford Flowback Water | Mass of Adsorbent | Adsorption Time |
| 1: Grill Charcoal | 10 mL | 4 g | 24 hrs |
| 2: Activated Carbon (from coconut shell) | 10 mL | 4 g | 24 hrs |
| 3: Activated Carbon (regular) | 10 mL | 4 g | 24 hrs |
| 4: Biochar | 10 mL | 4 g | 24 hrs |
| 5: Control | 10 mL | — | 24 hrs |
| 6: Biochar | 10 mL | 2 g | 24 hrs |

A second Trial was conducted utilizing 2.0 g of each adsorbent instead of 4.0 g as in Trial 1. The same procedure was employed where the samples were left for 24 hours for adsorption and then the remaining liquid was removed with a pipette and placed in a vial on a hot plate at 100° C. A different sample of flowback water was employed. The results are provided below:

| Trial 2: Total Dissolved Solids Removal Data | | | |
|---|---|---|---|
| Sample | Wastewater | Mass of Adsorbent | Adsorption Time |
| 1: Grill Charcoal | 10 mL | 2 g | 24 hrs |
| 2: Biochar | 10 mL | 2 g | 24 hrs |
| 3: Activated Carbon (regular) | 10 mL | 2 g | 24 hrs |
| 4: Control | 10 mL | — | 24 hrs |

| Trial 2: Residue Data | | | |
|---|---|---|---|
| Sample | Initial Total Dissolved Solids | Final Residue | Total Dissolved Solids Removal Percentage, wt % |
| 1: Activated carbon (regular) | 31.25% | 20.0% | 36.0% |
| 2: Biochar | 31.25% | 11.9% | 61.9%. |
| 3: Grill Charcoal | 31.25% | 26.3% | 15.8% |

As can be seen from all of the above, biochar is an effective adsorbent for treating the impurities contained in contaminated water, such as flowback water. The biochar indicates the ability to absorb and therefore remove up to about 87.6% of the residue found in, e.g., flowback water, which residues are contemplated to include organic and/or inorganic contaminants. It is noted that in the above experiments, an oil layer would sometimes appear as a top layer in the contaminated water, which was removed to allow for water evaporation.

It can also be seen from the above that the level of biochar for water purification of contaminated water such as flowback water may preferably fall in the range of 0.5% by

| Trial 1: Total Dissolved Solids Removal Data | | | | | |
|---|---|---|---|---|---|
| Sample | Mass of Vial | Mass before heat | Mass after heat | Residue % | Total dissolved solids removal percentage, wt % |
| 1: Grill Charcoal | 21.07 g | 30.57 g | 21.85 g | =100 * (21.85 − 21.07)/(30.57 − 21.07) = 8.21% | =100 * (8.16% − 8.21%)/8.16% = −0.6% |
| 2: Activated Carbon (from coconut shell) | 21.21 g | 30.34 g | 21.90 g | =100 * (21.90 − 21.21)/(30.34 − 21.21) = 7.56% | =100 * (8.16% − 7.56%)/8.16% = 7.35% |
| 3: Activated Carbon (regular) | 21.23 g | 30.15 g | 21.82 g | =100 * (21.82 − 21.23)/(30.15 − 21.23) = 6.61% | =100 * (8.16% − 6.61%)/8.16% = 19.0% |
| 4: Biochar | | *4 g of biochar absorbed the sample immediately* | | | |
| 5: Control | 21.24 g | 32.88 g | 22.19 g | =100 * (22.19 − 21.24)/(32.88 − 21.24) = 8.16% | control |
| 6: Biochar | 21.15 g | 26.09 g | 21.20 g | =100 * (21.20 − 21.15)/(26.09 − 21.15) = 1.01% | =100 * (8.16%− 1.01%)/8.16% = 87.6% | weight to 30% by weight of the water present. In addition, the biochar is such that it is capable of absorbing up to about 90% by weight of the dissolved solids in the contaminated water, and more generally, in the range of 40% by weight to 90% by weight. The preferred adsorption time for the biochar to achieve removal of the dissolved solids takes place over a period of up to and including 24 hours, and more preferably, the time period for adsorption is 12-24 hours. More preferably, the amount of dissolved solids removed by the biochar may fall in the range of at least 50% by weight to 90% by weight of dissolved solids in contaminated water, and in a most preferred embodiment, the amount, 75% by weight to 90% by weight.

What is claimed is:

1. A method for treatment of water to produce recycled water comprising:
    providing water for treatment containing organic and inorganic contaminants;
    filtering the water containing organic and inorganic contaminants through a particulate filter to remove 60 mesh or larger particulate contaminants present in the water thereby providing filtered water containing organic and inorganic contaminants;
    supplying a plurality of biochar sorbent bed pairs, each biochar sorbent bed pair including a first biochar sorbent bed and a second biochar sorbent bed arranged in parallel such that flow alternates between the first biochar sorbent bed and the second biochar sorbent bed,
wherein biochar contained in said biochar sorbent beds is made by heating biomass in a low or no oxygen environment for 1.0-3.0 hours a temperature of 300° C. to 600° C. to provide biochar sorbent having a surface area in the range of 200 m²-500 m²;
    supplying said filtered water containing organic and inorganic contaminants to at least one biochar sorbent bed in at least one of said plurality of biochar sorbent bed pairs wherein said biochar removes all or a portion of said contaminants to produce recycled water;
    recovering said recycled water wherein said levels of contaminants are reduced or removed;
    regenerating said at least one biochar sorbent bed in at least one of said plurality of biochar sorbent bed pairs using steam to remove at least a portion of said contaminants from said at least one biochar sorbent bed followed by washing the biochar absorbent bed with a solution of sodium carbonate to precipitate and remove metal ions from the biochar absorbent bed; and
    recycling at least a portion of a condensate from said steam used to regenerate said at least one biochar sorbent bed to said particulate filter.

2. The method of claim 1 wherein said water for treatment comprises flowback water from drilling operations.

3. The method of claim 1 wherein said water for treatment comprises tailing water from tar sand production.

4. The method of claim 1 wherein said biomass is selected from the group consisting of oak wood chips, dewaxed pine wood chips, cellulose, plant hulls, lignin, or mixtures thereof.

5. The method of claim 1 wherein said at least one biochar sorbent bed is a regenerated biochar sorbent bed.

6. The method of claim 1 wherein said water is passed through said at least one biochar sorbent bed at a rate of 5.0 liters/minute to 50.0 liters/minute.

7. The method of claim 1 wherein said plurality of biochar sorbent bed pairs comprises said sorbent bed pairs positioned in parallel and said method of water treatment is continuous.

8. A method for treatment of contaminated water to produce recycled water comprising:
    supplying contaminated water that includes dissolved solids to be removed;
    filtering said contaminated water through a particulate filter to remove 60 mesh or larger particulate contaminants present in the water thereby providing filtered contaminated water;
    treating said filtered contaminated water with biochar disposed in each of a plurality of biochar sorbent bed pairs, each biochar sorbent bed pair including a first biochar sorbent bed and a second biochar sorbent bed arranged in parallel, wherein each biochar bed contains biochar such that flow alternates between the first biochar sorbent bed and the second biochar sorbent bed, wherein biochar contained in the biochar sorbent beds is made by heating biomass in a low or no oxygen environment for 1.0-3.0 hours a temperatures of 300° C. to 600° C. to provide biochar sorbent having a surface area in the range of 200 m²-500 m², wherein said biochar is present at a level of 0.5% by weight to 30% by weight of said contaminated water;
    removing 40% by weight to 90% by weight of said dissolved solids in said contaminated water;
    upon breakthrough, regenerating at least one of said first biochar sorbent bed and said second biochar sorbent bed in at least one pair of biochar sorbent beds using steam to remove at least a portion of said contaminants from said biochar followed by washing the biochar sorption bed with a solution of sodium carbonate to precipitate and remove metal ions from the biochar sorption bed; and
    recycling at least portion of a condensate from said steam used to regenerate said biochar to said particulate filter.

9. The method of claim 8 wherein said contaminated water comprises flowback water from drilling operations.

10. The method of claim 8 wherein said contaminated water for treatment comprises tailing water from tar sand production.

11. The method of claim 8 comprising removing 50% by weight to 90% by weight of said dissolved solids.

12. The method of claim 8 comprising removing 75% by weight to 90% by weight of said dissolved solids.

13. The method of claim 8 wherein said biochar is present at a level of 10.0 wt. % to 30.0 wt. % of said contaminated water.

14. The method of claim 8 wherein said biochar is present at a level of 15.0 wt. % to 25.0 wt. % of said contaminated water.

15. A method for treatment of flowback water from drilling operations comprising:
    supplying flowback water containing contaminants that include dissolved solids to be removed;
    filtering said flowback water through a particulate filter to remove 60 mesh or larger particulate contaminants present in the water thereby providing filtered flowback water;
    treating said filtered flowback water with biochar disposed in each of a plurality of biochar sorbent bed pairs, each biochar sorbent bed pair including a first biochar sorbent bed and a second biochar sorbent bed arranged in parallel such that flow alternates between the first biochar sorbent bed and the second biochar sorbent bed, wherein biochar contained in the biochar sorbent beds is made by heating biomass in a low or no oxygen environment for 1.0-3.0 hours a temperatures of 300° C. to 600° C. to provide biochar sorbent having a surface area in the range of 200 m²-500 m², wherein said biochar is present at a level of 10.0% by weight to 30% by weight of said flowback water;

removing 40% by weight to 90% by weight of said dissolved solids in said flowback water;

upon breakthrough, regenerating said biochar using steam to remove at least a portion of said contaminants from said biochar sorption bed followed by washing the biochar sorption bed with a solution of sodium carbonate to precipitate and remove metals from the biochar sorption bed; and recycling at least a portion of a condensate from said steam used to regenerate said biochar to said particulate filter.

16. The method of claim 15 wherein said biomass includes pine wood chips.

* * * * *